(12) United States Patent
Schwartz, Jr. et al.

(10) Patent No.: US 7,200,745 B2
(45) Date of Patent: Apr. 3, 2007

(54) SYSTEM AND METHOD FOR SPECIFYING AND UTILIZING HARDWARE FUNCTIONALITY BY EXECUTING A COMMON HARDWARE REGISTER PSEUDO-LANGUAGE

(75) Inventors: James A. Schwartz, Jr., Seattle, WA (US); Stephane G. Plante, Kirkland, WA (US); Robert B. Nelson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/661,691

(22) Filed: Sep. 12, 2003

(65) Prior Publication Data
US 2005/0060525 A1    Mar. 17, 2005

(51) Int. Cl.
*G06F 9/24* (2006.01)
*G06F 9/44* (2006.01)
(52) U.S. Cl. .................. 713/1; 719/321; 719/327
(58) Field of Classification Search ............. 713/1, 713/2, 100; 719/321, 322, 323, 324, 327; 710/8, 15, 104; 717/211, 121
See application file for complete search history.

(56) References Cited

U.S. PATENT DOCUMENTS

| | | | |
|---|---|---|---|
| 5,481,755 A | | 1/1996 | Harper et al. |
| 5,802,365 A | * | 9/1998 | Kathail et al. ............ 719/321 |
| 5,809,329 A | | 9/1998 | Litchman et al. |
| 5,890,011 A | | 3/1999 | Abbondanzio et al. |
| 6,633,929 B1 | | 10/2003 | Hyder et al. |
| 6,941,558 B2 | * | 9/2005 | Hill et al. ................. 719/321 |
| 6,993,643 B2 | * | 1/2006 | Powell ........................ 713/1 |
| 2003/0056090 A1 | * | 3/2003 | Khanna et al. .............. 713/1 |

OTHER PUBLICATIONS

Curt Mayer, XF86_SVGA with S3 cards?, Jan. 24, 1994, Google gourps: comp.windows.x.i386unix, pp. 14.*
Robert Deline and Manuel Fahndrich, "Enforcing High-Level Protocols in Low-Level Software", Proceedings of the ACM SIGPLAN 2001 Conference, pp. 59-69.

* cited by examiner

*Primary Examiner*—Thomas Lee
*Assistant Examiner*—Suresh K Suryawanshi
(74) *Attorney, Agent, or Firm*—Amin, Turocy & Calvin, LLP

(57) ABSTRACT

A system and method that utilizes a common hardware register pseudo-language are disclosed. The present invention employs a common platform to specify hardware functionality and to execute hardware action(s). Hardware actions can be effectuated by performing a series of instructions, which comprise hardware register primitives and resources utilized by the primitives. The hardware register primitives are operations defined according to the common hardware register pseudo-language. The series of instructions can be loaded prior to boot or during initialization.

35 Claims, 13 Drawing Sheets

150

| Action | Primitive Operation | Reserved | Size | Register Region | | | | | | | | Value | Mask |
|---|---|---|---|---|---|---|---|---|---|---|---|---|---|
| | | | | ID | Width | Offset | Reserved | Address 0 | Address 1 | Address 2 | Address 3 | | |
| 0x09 | 0x82 | 0 | 0x04 | 0x02 | 0x04 | 0x00 | 0x00 | 0x0000 | 0x0007 | 0x0003 | 0x006c | 0x00000400 | 0x00000400 |

160

| Action | Primitive Operation | Reserved | Size | Register Region | | | | | | | | Value | Mask |
|---|---|---|---|---|---|---|---|---|---|---|---|---|---|
| | | | | ID | Width | Offset | Reserved | Address 0 | Address 1 | Address 2 | Address 3 | | |
| 0x0B | 0x82 | 0 | 0x04 | 0x02 | 0x04 | 0x00 | 0x00 | 0x0000 | 0x0007 | 0x0003 | 0x006c | 0x00000000 | 0x00000400 |

FIG. 1b

SYSTEM AND METHOD FOR SPECIFYING AND UTILIZING HARDWARE FUNCTIONALITY BY EXECUTING A COMMON HARDWARE REGISTER PSEUDO-LANGUAGE

TECHNICAL FIELD

The present invention relates generally to utilizing a common hardware representation language, and more particularly to systems and methods that can utilize a common hardware register representation language to specify hardware functionality.

BACKGROUND OF THE INVENTION

In the computer hardware industry, there is a trend to develop devices with unique functionality. For example, hardware vendors seek to incorporate unique (e.g., proprietary) features to differentiate their device(s) from that of competitors. For example, even though register-based devices (e.g., debugger port, EMS port, system timer, interrupt controller, bus controller, . . . ) employ hardware registers for communication and control, such devices can utilize the hardware registers in disparate manners depending on the vendor's design specification. Resources of register based devices include I/O, memory mapped or Configuration Registers. Register(s) can be physically located within the hardware or in another location, the size of a register(s) can vary (e.g., 16 bit, 32 bit, . . . ), the function of a respective bit can vary, hardware functionality can differ depending on whether a bit is written to or read from, or how it is written to or read from, etc.

Traditionally, utilization of these functionalities (e.g., unique to specific device, common within a class of devices, . . . ) associated with register based hardware required developing a software driver that was hardware specific such that the driver correlated with semantics of the particular device. Numerous limitations result from the need for hardware specific device drivers. High costs are often associated with developing hardware specific device drivers, extensive software development time can be required to develop software capable of employing unique hardware functionalities, hardware development and utilization typically is slowed by unavailability of software capable of taking advantage of unique features of the hardware initially when new hardware functionalities are created, and software development can be slowed because the software must conform with requirements of the hardware.

Another shortcoming of conventional register based hardware is that hardware can be inaccessible prior to operating system kernel availability because a hardware specific device driver is required to interact with the device. Some operating system environments require access to the device prior to operating system boot up. Such limitation can render the hardware unusable for applications, such as, for example, a watchdog timer implemented to detect and respond to system failures prior to boot up and during initialization.

There exists a need in the art for systems and methods that can facilitate operation of hardware devices during the entire lifetime of the operating system, including boot and shutdown time. Additionally, there exists a need for a simple, common platform to describe hardware functionality to reduce costs and time associated with developing hardware specific device drivers. Furthermore, systems and methods are lacking which are extensible to enable utilization of additional features in future hardware. Thus, there exists a need in the art for a system and/or method for utilizing a common language for performing high level actions.

SUMMARY OF THE INVENTION

The following is a summary of the invention in order to provide a basic understanding of various aspects of the invention. This summary is not intended to identify key/critical elements of the invention or to delineate the scope of the invention. Its sole purpose is to present some concepts of the invention in a simplified form as a prelude to the more detailed description that is presented later.

The present invention provides for a system and method for utilizing a common hardware representation language. The common hardware register representation language can describe hardware functionality and can be utilized to execute hardware action(s). The hardware functionality can be specified in a manner that abstracts the device resources. Some operating system environments require access to hardware devices prior to operating system kernel availability. Typically, hardware functionality can be implemented through specification of a finite set of hardware register operations. The present invention provides a framework for specifying hardware functionality and executing device action(s) through a common hardware register pseudo-language. The invention facilitates software development for a device class by providing a common abstraction of device specific instructions and resources needed to execute device functionality. The common hardware register pseudo-language utilizes primitives which are basic operations implemented on hardware registers. An instruction comprises the primitive and the resources upon which the primitive acts. Vendors can link together a set of instructions to perform an action. The set of instructions can be loaded with an Advanced Configuration and Power Interface (ACPI) table for implementation prior to boot or during initialization.

Thus, the hardware register language of the subject invention describes a device's functionality (e.g., high level actions that can performed with a particular hardware device) using the action/instruction/primitive operation notation. The primitive operations can vary slightly with each respective implementation, but the language abstracts hardware at the instruction level. Therefore software can be written for device functionality which corresponds to actions that can be performed on a device.

Hardware is typically register based such as, for example, a watchdog timer, debugger port, EMS port, interrupt controller, bus controller, etc. Functionality associated with the hardware is often unique for respective vendor specific hardware devices. The common hardware register pseudo-language provides a framework for vendor specification and execution of hardware functionality utilizing the series of instructions. The hardware register primitives can be, for example, reading or writing a set of bits on the hardware register. The hardware register primitives can be defined according to the common hardware register pseudo-language, and as noted above can be loaded with the ACPI table prior to boot or during initialization. Thus, the invention facilitates use of a common hardware driver to support unique functionality of the hardware device and the functionality can be utilized prior to operating system kernel availability.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 1b illustrates a couple of specific actions of the watchdog timer in accordance with the subject invention

DETAILED DESCRIPTION OF THE INVENTION

Figure 1A:
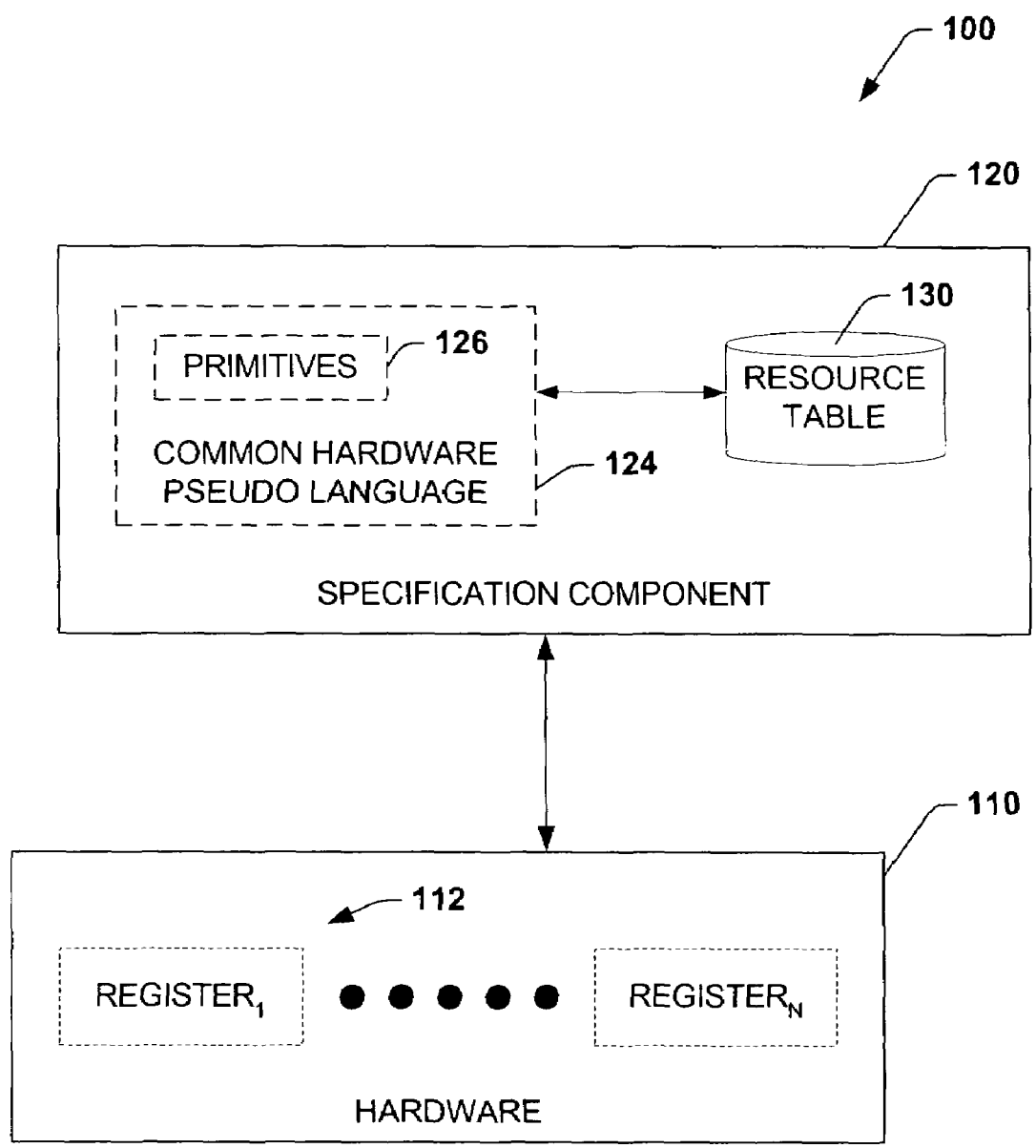
FIG. 1a is an illustration of a system for specifying hardware functionality in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, some or all of the functionality associated with modules, systems and/or components discussed herein can be achieved in any of a variety of ways (e.g., combination or individual implementations of active server pages (ASPs), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (OR-DBMS), remote method invocation (RMI), C, C++, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Accordingly, the subject invention can employ various artificial intelligence based schemes for carrying out various aspects of the subject invention. Classification in accordance with the subject invention can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

The present invention relates generally to systems and methods for utilizing a common hardware register representation language, and more specifically to utilizing a common hardware register representation language to specify hardware functionality. The systems and methods provide a framework for specifying hardware functionality through a common hardware register pseudo-language. The common hardware register pseudo-language provides a set of hardware register primitives. The invention facilitates vendor specification of hardware functionality by utilizing a subset of the hardware register primitives. The subset of primitives (corresponding to the register based hardware devices) can be loaded with an Advanced Configuration and Power Interface (ACPI) table, and thus facilitate functionality prior to boot or during initialization.

As noted supra, the hardware register language of the subject invention describes a device's functionality (e.g., high level actions that can performed with a particular hardware device) using the action/instruction/primitive operation notation. The primitive operations can vary slightly with each respective implementation, but the language abstracts hardware at the instruction level. Therefore software can be written for device functionality which corresponds to actions that can be performed on a device.

FIG. 1a illustrates a block diagram of a system 100 that specifies hardware functionality in accordance with an aspect of the present invention. The hardware 110 can be a register-based device such as, for example, a watchdog timer, debugger port, EMS port, interrupt controller, bus controller, etc. In general, a register can be a collection of two or more D flip-flops with a common clock input. The number of D flip-flops determines the size of the register. The present invention contemplates hardware devices 110 created by various hardware vendors utilizing disparate registers 112 varying in size, value, location, etc. For example, the size of the registers can be 16 bits, 32 bits, 64 bits, etc. Therefore, the present invention contemplates utilization of a vendor's unique hardware 110 with disparate functionality, distinctive register design, etc.

The system 100 additionally comprises a specification component 120 that specifies functionality of the hardware 10. The specification component 120 typically employs a language, such as a common hardware register pseudo-language 124. Such pseudo-language 124 can include a set of hardware register primitives 126 (e.g., reads, writes, masked reads, masked writes, . . . ) which are defined for a device class and are a complete set of possible operations that can be performed upon a generic hardware register and thus, provides a common framework for specifying functionality. The pseudo-language 124 facilitates utilization of a common driver to support the hardware device 110 and thus, allows for an operating system to simply employ the hardware devices possessing unique functionalities. Execution of the hardware register primitive 126 on a specific resource is called an instruction.

The specification component 120 can employ a subset series of instructions linked together to effectuate high level functionality (e.g., shut down computer, resetting a timer, . . . ). An instruction comprises the primitive and resources to perform the primitive (e.g., register's location, register's size, value, a bitmask detailing the bits to read and/or write, an indicator identifying the action which the instruction is a part, . . . ). The series of instructions can be referred to as an action. The present invention contemplates linking primitive operations on a set of registers, linking primitive operations on one register, etc. The series of linked instructions is defined for the hardware device 110 and effectuates operation of hardware functionalities, which can be unique to the device, common for a class of devices, etc. through a common platform. According to one particular aspect of the present invention, the specification component 120 can utilize a resource table 130 that describes the linked instructions which comprises hardware register primitives and accompanying resources that constitute each hardware action. Included in the resource table 130, for example, can be a series of instructions with, for example, the primitive operation, the register's location, register's size, value, a bitmask detailing the bits to read and/or write, an indicator identifying the action which the instruction is a part, etc. Instructions for a single action can utilize the same indicator; however, in other aspects different indicators can be used. The resource table 130 can thus be transferred to the operating system, for example, with an Advanced Control and Power Interface (ACPI) table.

The following discussion with respect to FIG. 1b, highlights one particular aspect of the hardware register language in connection with exemplary actions for a watchdog timer. A high level action may be achieved by a series of operations on a hardware device. The resources, and even operations can change from device to device but each can be abstracted as a series of instructions (as defined by the application) in accordance with the subject invention.

An instruction can include the following information:

Instruction:

Action Flag: The action flag indicates an action the particular instruction is a part of. If multiple instructions are supported per action one can consider an additional field indicating a position in the instruction series where a particular instruction takes place, in order to perform the specified action. In the watchdog timer, position is not required for this particular example, because in this particular implementation of the invention, the order of the instructions (in the resource table FIG. 1a) determine position of the instruction in the action's instruction series.

Primitive Operation: The operation of the instruction. This can include, but is not limited to register reads, writes, masked reads, masked writes. In the implementation of the watchdog timer, eight primitive operations are defined, a read value, read countdown, write value and a write countdown each with a primitive operation that preserves the existing register value and one that does not preserve the existing register value.

Instruction Arguments:

Register: The register of the instruction.

Bits in the register that pertain to the instruction: This can be described by a bit mask, indicating the bits within the register that pertain to the instruction. One example of this is the watchdog timer which defined the bit mask to have the bit set for each relevant bit of the register. (See watchdog excerpt below).

Value: The value corresponding to the specified instruction. The meaning of the value will vary for each primitive operation and it's actual value will vary for each device.

The following excerpt provides additional context for the hardware watchdog timer in accordance with the subject invention.

Field Descriptions:

Register Region is described as a Generic Address Structure. This structure describes the physical address of a register as well as the bit range that corresponds to a desired region of the register. The bit range is defined as the smallest set of consecutive bits that contains every bit in the register that is associated with the Watchdog Instruction. For example, if bits [6:5] and bits [3:2] all correspond to a Watchdog Instruction, the bit range for that instruction would be [6:2]. Since a bit range could contain bits that do not pertain to a Watchdog Instruction (such as bit 4 in the example above), a bit mask is required to distinguish all bits in the region that do correspond to the instruction. A Mask field is defined to be this bit mask with a bit set to a '1' for each bit in the bit range (defined by Register Region) corresponding to the Watchdog Instruction. Note that bit 0 of the bit mask corresponds to the lowest bit in the bit range. In the example used above, the mask would be 11011b or 0x1B.

Previously, the Generic Address Structure did not define size of the register it described. Reading or writing arbitrary bytes of a register can lead to indeterminate system behavior. As a result, the Watchdog Instruction Entry has a Register Size field to describe the size of the register.

A Watchdog Instruction can be one of four instructions. The Value field of the Watchdog Instruction Entry has a specific meaning for each of the four instructions and each type of Watchdog Action. In general, the value field provides a mechanism to translate the value stored in the register to an internal format and vice versa.

Watchdog Instructions
    WATCHDOG_INSTRUCTION_READ_VALUE
    A Read Value Instruction reads Register Region and compares the resultant with Value. If the values are not equal, the instruction failed as did the parent Watchdog Action. This can be described in pseudo code as follows.
        X=Read(register)
        X=X>>Bit Offset described in Register Region
        X=X & Mask
        If (X !=Value) FAIL
        SUCCEED
    WATCHDOG_INSTRUCTION_READ_COUNTDOWN
    A Read Countdown Instruction reads Register Region. The resultant is a countdown value and should not be compared with Value. Value will be ignored. The countdown value is in count intervals. This can be described in pseudo code as follows.
        X=Read(register)
        X=X>>Bit Offset described in Register Region
        X=X & Mask
        Return X
    WATCHDOG_INSTRUCTION_WRITE_VALUE
    A Write Value Instruction writes Value to the Register Region. If WATCHDOG_PRESERVE_REGISTER is set in Instruction Flags, then the bits not corresponding to the Write Value Instruction are preserved. If the register is preserved, Write Value Instruction requires a read of the register. This can be described in pseudo code as follows.
        X=Value & Mask
        X=X<<Bit Offset described in Register Region
        If (Preserve Register)
            Y=Read(register)
            Y=Y &~(Mask <<Bit Offset)
            X=X|Y
        Write(X, Register)
    WATCHDOG_INSTRUCTION_WRITE_ COUNTDOWN
    A Write Countdown Instruction writes the internal Hardware Watchdog Timer Driver countdown value to the Register Region. The countdown value is the number of count intervals the driver has chosen to use for a countdown period. Value will be ignored. If WATCHDOG_PRESERVE_ REGISTER is set in Instruction Flags, then the bits not corresponding to the Write Countdown Instruction are preserved. If the register is preserved, Write Value Instruction requires a read of the register. This can be described in pseudo code as follows.
        X=countdown value
        X=X & Mask
        X=X<<Bit Offset described in Register Region
        If (Preserve Register)
            Y=Read(register)
            Y=Y &~(Mask <<Bit Offset)
            X=X|Y
        Write(X, Register)

The above discussion is intended to provide context and highlight various novel aspects of the hardware register language of the subject invention, and it is to be appreciated that the subject invention is not limited to such these particular examples.

FIG. 1a illustrates a couple of specific actions of the watchdog timer in accordance with the subject invention. The encoding of table 150 are instruction(s) to enable the watchdog timer. The instruction(s) indicate that primitive 0x82 (Preserving Write) should be employed to touch a register that is 32 bits wide located in PCI configuration space at Bus 0, Device 7, Function 3, and Offset 6c. The value used to enable the .watchdog is 0x400 along with a mask of 0x400. This means that the instruction should only set the $11^{th}$ bit in the register to 0x1 and leave all other bits alone.

The encoding of table 160 is the instruction(s) to disable the watchdog timer. The instruction indicates that primitive 0x82 (Preserving Write) should be employed to touch a register 32 bits wide located in PCI configuration space at Bus 0, Device 7, Function 3, Offset 6c. The value used to disable the watchdog is 0 along with a mask of 0x400. This means that the instruction should only clear the $11^{th}$ bit in the register to 0x1 and leave all other bits alone. See FIG. 6 and discussion related thereto for another exemplary discussion relating to watchdog timers in accordance with the subject invention. Further high-level aspects of the subject invention will now be discussed in connection with the drawings.

Figure 2:
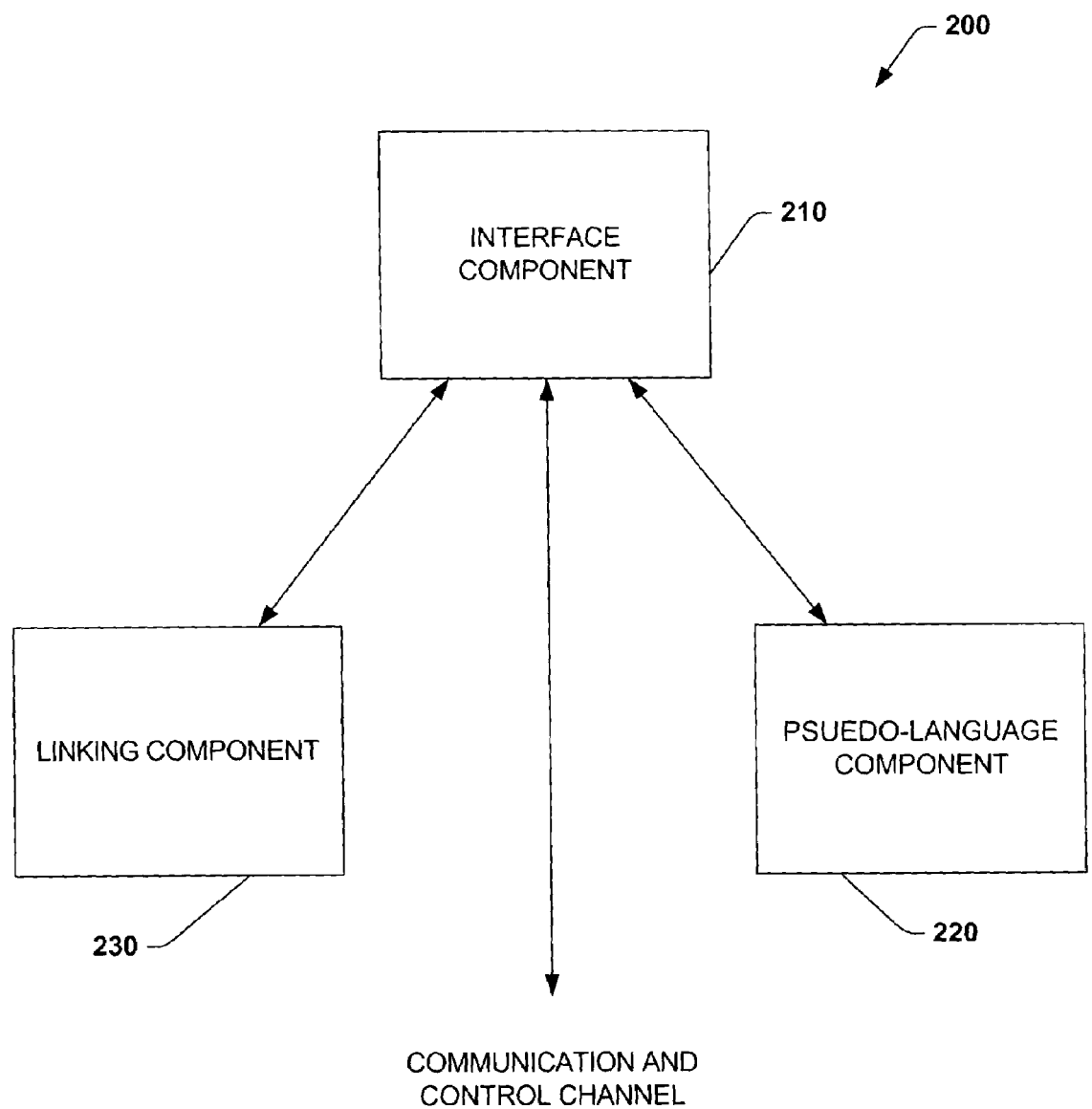
FIG. 2 is an illustration of a system for specifying hardware functionality in accordance with an aspect of the present invention.

FIG. 2 illustrates a system 200 for specifying hardware functionality in accordance with an aspect of the present invention. The system 200 comprises an interface component 210 that can communicate with software, firmware and/or hardware, for example, to facilitate higher level functionality. The interface component 210 can interact with the hardware registers associated with such software, firmware and/or hardware. The hardware registers can vary in size, location, value, etc. to facilitate unique functionality.

The interface component 210 typically utilizes a pseudo-language component 220 and a linking component 230. The pseudo-language component 220 provides a set of hardware register primitives that are operable upon the associated hardware. The hardware register primitives include, for example, reads, writes, masked reads and masked writes of hardware register(s). The pseudo-language component 220 can be utilized as a common platform for describing unique hardware devices and executing device action(s). The pseudo-language component 220 can facilitate use of a common driver to leverage functionality of unique hardware devices—thus, the need for hardware specific drivers can be mitigated since a common framework can be utilized to describe primitive operations performed upon hardware registers for the particular device.

The linking component 230 can be employed to link a series of instructions, which comprise hardware register primitives and resources utilized by the primitives that are described by the pseudo-language component 220. For example, the linking component 230 can join together a subset of hardware register primitives from the set of primitives described by the pseudo-language component 220 to perform a given device action The series of instructions describe a higher level hardware action such as, for example, rebooting the system, resetting a timer, etc. The instructions can operate on one hardware register or on a set of hardware registers. The series of instructions can populate a resource table which can include, for example, the primitive operation, the register's location, register's size, value, bitmask detailing the bits to read and/or write, an action indicator specifying which action the instruction is part of, etc. According to one aspect of the present invention, the linking component 230 can link together the series of instructions and store the action in firmware associated with a hardware device, however the present invention is not so limited.

According to another aspect of the invention, the resource table 130 can be loaded to the operating system concurrently with an Advanced Configuration and Power Interface (ACPI) table. The ACPI table facilitates robust operating system directed configuration and power management of devices. The ACPI table is loaded prior to operating system kernel availability. Therefore, the actions for unique hardware devices can be implemented prior to boot or during initialization. The present invention, however, is not so limited to require utilization of an ACPI table and/or device interaction during and/or prior to boot.

Figure 3:
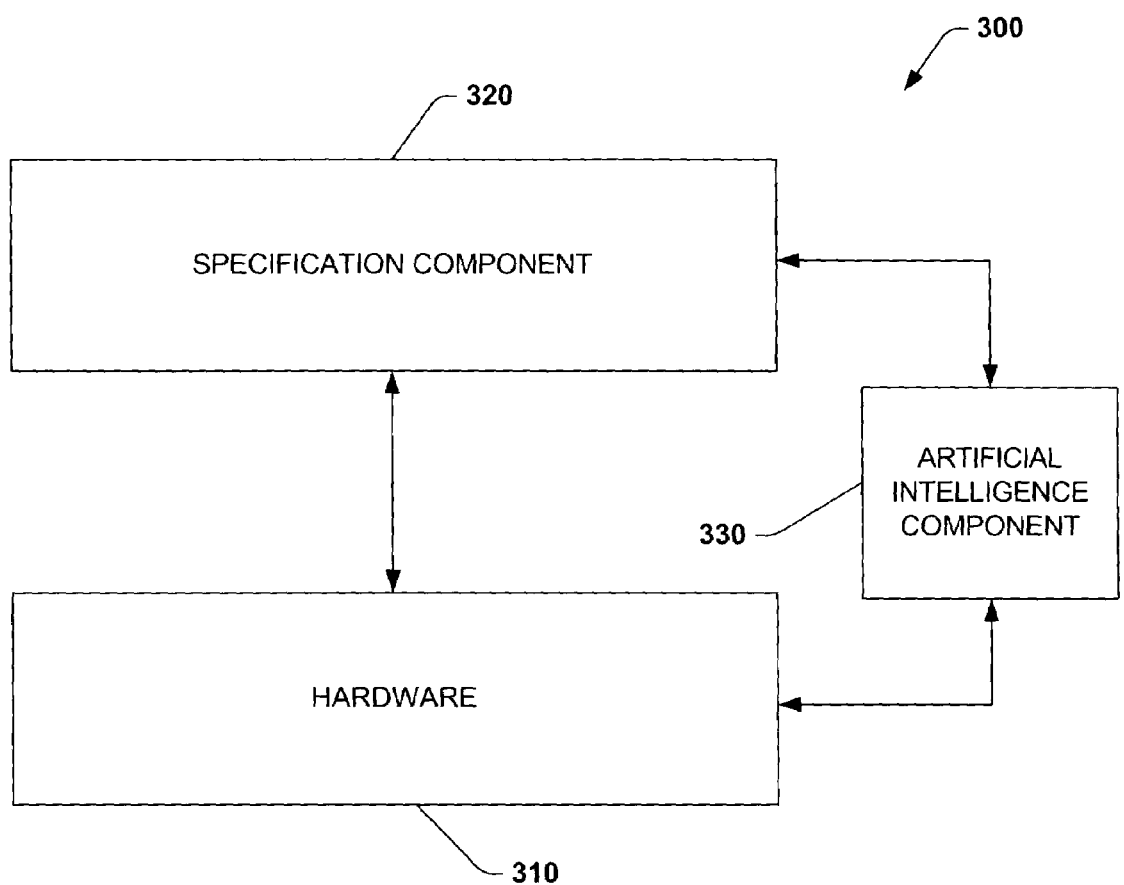
FIG. 3 is an illustration of a system for specifying hardware functionality in accordance with an aspect of the present invention.

FIG. 3 illustrates a system 300 for specifying hardware functionality in accordance with an aspect of the present invention. A hardware 310 (e.g., 110) can comprise any register based hardware device with unique, hardware specific functionality. It is to be appreciated that hardware 310 can include software, firmware and hardware components. A specification component 320 (e.g., 120 and 220) is operatively connected to the hardware 310 which facilitates specification of hardware functionality. The specification component 320 can employ a pseudo-language and a means to link instructions, for example via the pseudo language component 220 and the linking component 230, respectively.

As discussed supra, a pseudo-language component can employ a set of hardware register primitives. For example, the hardware register primitives can be reads, writes, masked reads, masked writes, etc. of the hardware registers associated with the hardware 310. The pseudo-language component is a common platform to describe unique, hardware specific functionality. The pseudo-language component permits use of a common driver to implement the hardware 310 and thus, reduces the need for hardware specific device drivers.

A linking component, as previously described, can join together a series of instructions for specifying an action or executing an action. The present invention contemplates that the action can be unique to one vendor's hardware device, or can be performed by a plurality of devices within the device's class.

An artificial intelligence component 330 can be employed to infer a series of hardware register primitives which comprise the action. The artificial intelligence component can query the hardware device 310 and determine functionalities of the hardware 310. Also, the artificial intelligence component 330 can infer the actions which can be effectuated by the hardware 310. Additionally, the artificial intelligence component 330 can infer the series of instructions which comprises each of the actions. Furthermore, the artificial intelligence component 330 can query the registers to determine primitive operation, location, size, etc. Utilizing the series of instructions, the artificial intelligence component 330 can populate a hardware resource table which includes, for example, the primitive operation, the register's location, size, value, bitmask describing the bits to read and/or write, action indicator specifying the action the instruction is part of, etc.

Thus, the AI component can employ for example a probabilistic-based and/or statistical-based analysis in connection with decision-making in accordance with the subject invention. Moreover, in connection with such decision making, the AI component 330 can perform a utility-based (e.g., cost benefit) analysis such that the cost associated with taking an incorrect action is weighed against the benefits of taking correct action in connection with the subject invention. As noted supra, inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As will be readily appreciated from the subject specification, the subject invention can employ classifiers that are explicitly trained (e.g., via a generic training data relating to registers and functionalities) as well as implicitly trained (e.g., via observing user and/or device behavior, receiving extrinsic information . . . ) so that the classifier(s) automatically perform actions in accordance with desired preferences. For example, with respect to Support Vector Machines (SVM) which are one specific type of classifier—based tools—it is to be appreciated that other classifier models can also be utilized such as Naive Bayes, Bayes Net, decision tree and other learning models—SVM's are configured via a learning or training phase within a classifier constructor and feature selection module. A classifier can be a function that maps an input attribute vector, x=(x1, x2, x3, x4, xn), to a confidence that the input belongs to a class—that is, f(x)=confidence(class).

To illustrate an aspect of the present invention, a watchdog timer can be queried by the artificial intelligence component 330. The artificial intelligence component 330 can determine actions which can be performed by the watchdog timer, such as, for example, resetting the timer. Utilizing the common platform described by the pseudo-language, the artificial intelligence component 330 can determine a series of instructions to effectuate the action. The linking component can then join together the instructions and populate the hardware resource table with the hardware register primitives and associated resources.

Figure 4:
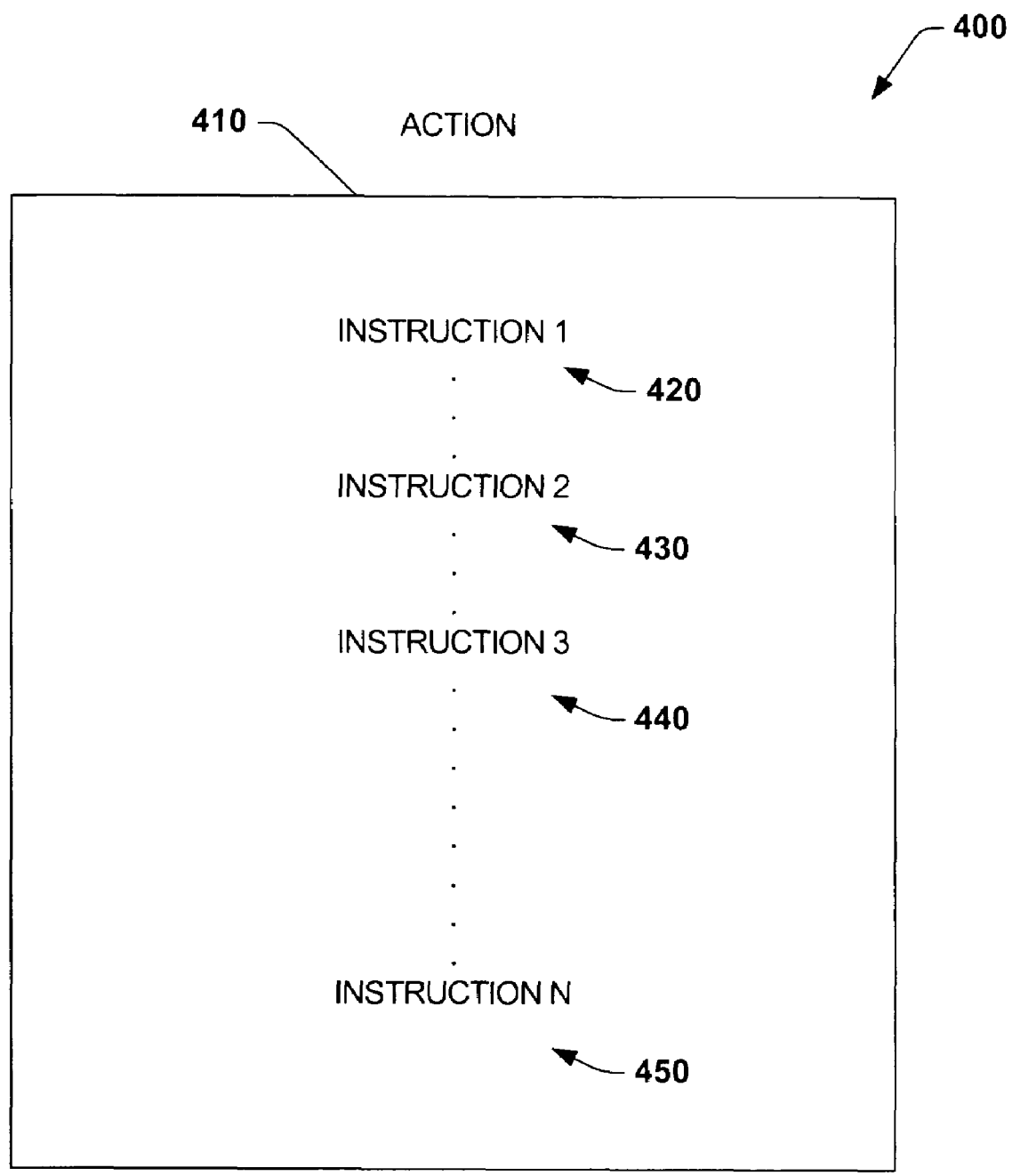
FIG. 4 illustrates an instruction set for specifying hardware functionality in accordance with an aspect of the present invention.

FIG. 4 illustrates an instruction set 400 that specifies a higher level action 410 in accordance with an aspect of the present invention. The high level action 410 can be, for example, rebooting a computer, resetting a timer, etc. A series of instructions (e.g., instruction 1 (420), instruction 2 (430), instruction 3 (440), . . . , instruction N (450)), which operate on one or more hardware register(s) associated with the hardware device effectuate the hardware action 410. The instructions 420–450 comprise operations such as, for example, reads, writes, masked reads, masked writes, etc. of hardware register(s). In addition to the primitive operation, implementation of the action requires the instructions 420–450 to employ the register's location, size, value, bitmask describing bits to read and/or write, etc. Furthermore, an action indicator can be included with each primitive operation to identify the action with which the instruction is associated.

The present invention contemplates a plurality of actions 410 associated with respective hardware device. A single software driver can execute the instruction set for a particular action by performing the series of instructions 420–450 associated with the action 410 since the instructions are described in a common manner utilizing a common hardware representation pseudo-language. Therefore, higher level actions 410 can be performed without hardware specific drivers.

Figure 5:
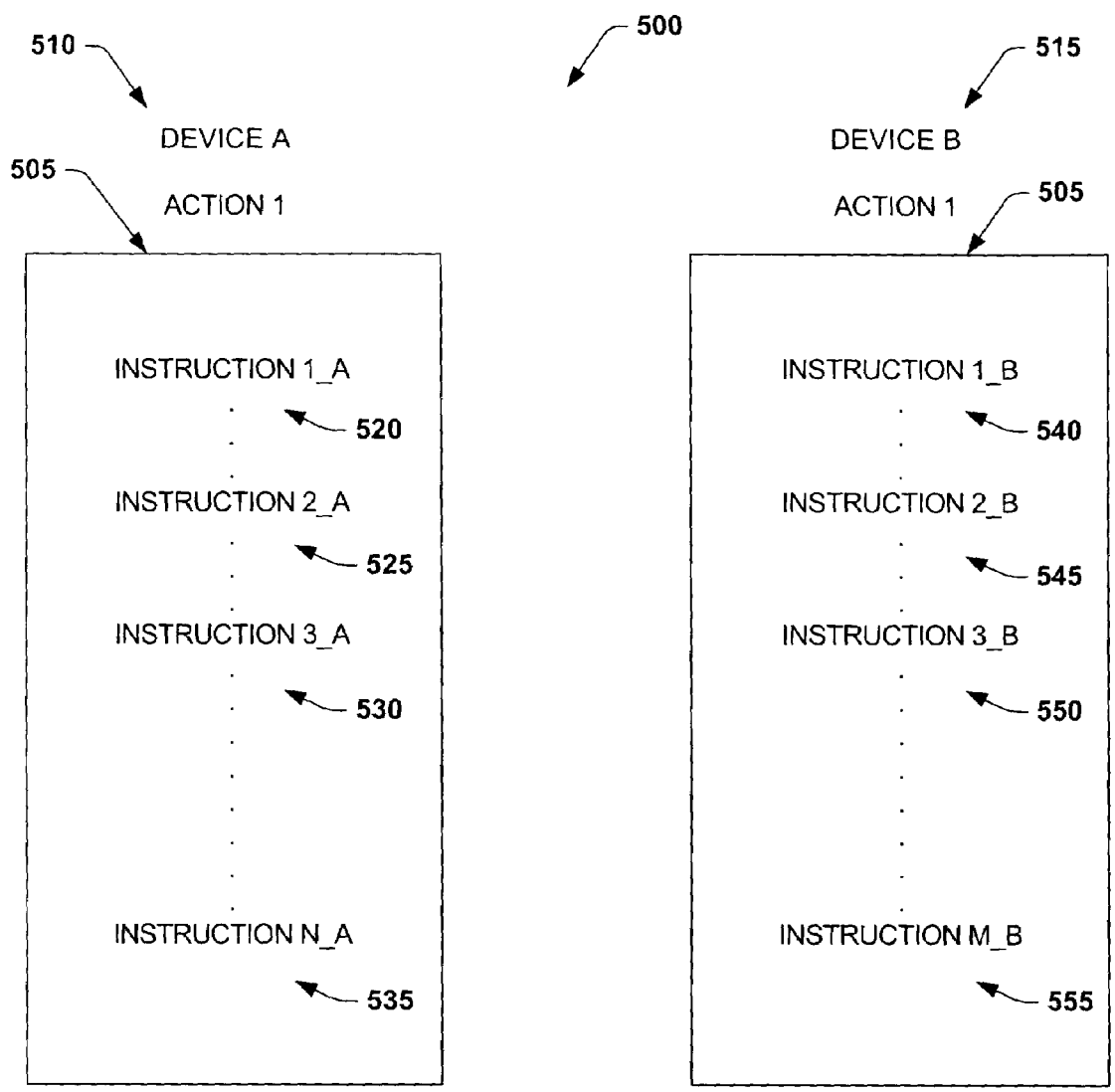
FIG. 5 illustrates an instruction set for specifying hardware functionality in accordance with an aspect of the present invention.

FIG. 5 illustrates instruction sets 500 for facilitating a higher level action 505 utilizing disparate hardware devices 510–515 in accordance with an aspect of the present invention. Device A (510) and Device B (515) can perform Action 1 (505), which can be, for example, rebooting a system, resetting a timer, etc. The devices 510–515 can be manufactured by different vendors, can have disparate functionalities and can employ registers which operate differently.

Both Device A (510) and Device B (515) can perform Action 1 (505). In the example, device 510 utilizes instructions 520–535, whereas device 515 utilizes instructions 540–555. The chain of instructions differ from device to device, as demonstrated by Device A (510) utilizing a series comprising Instruction 1_A (520), Instruction 2_A (525), Instruction $3_{13}$ A (530), . . . , Instruction N_A (535) and Device B (515) employing a series comprising Instruction 1_B (540), Instruction 2_B (545), Instruction 3_B (550), . . . , Instruction M_B (555). Additionally, the number of instructions that encompass each action can vary between devices.

Figure 6:
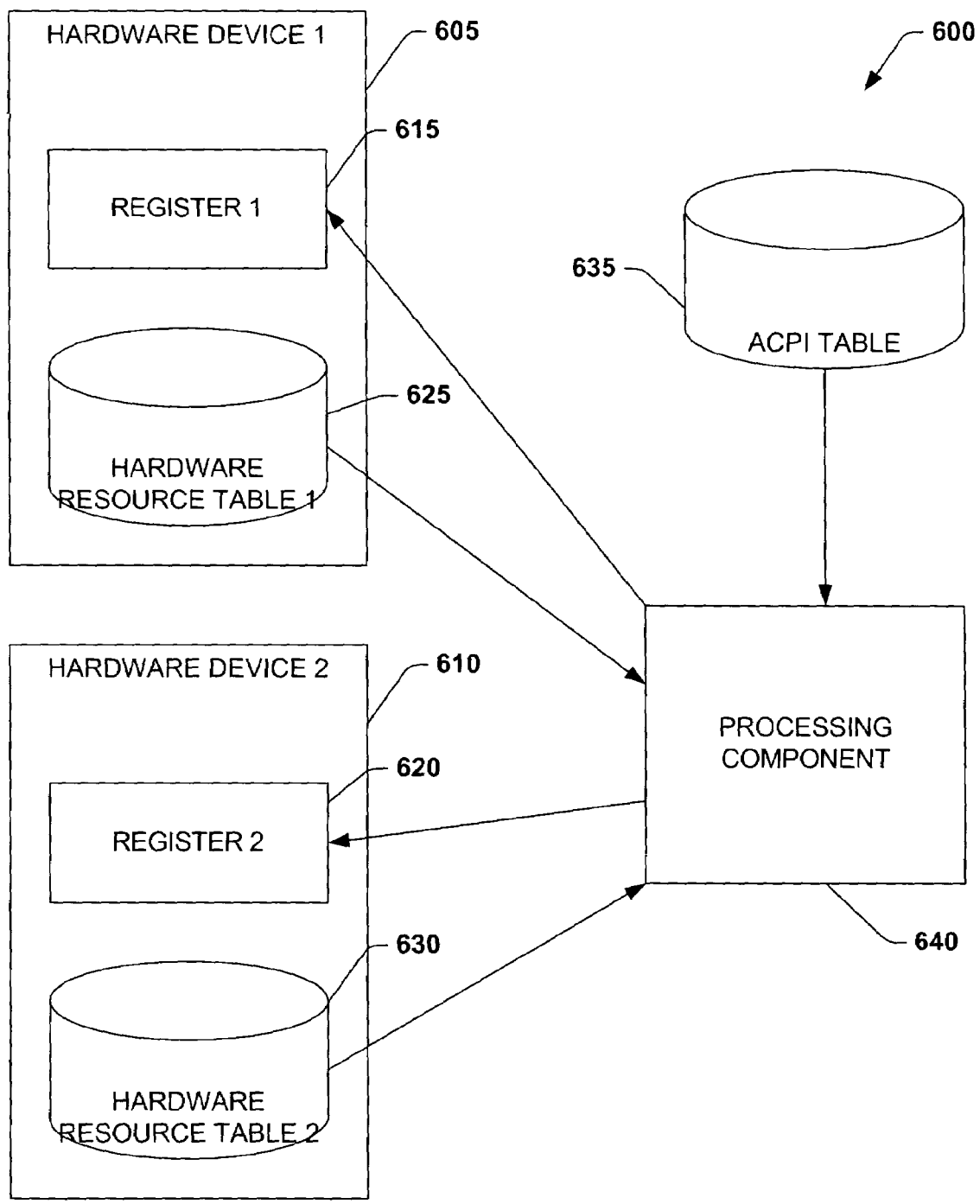
FIG. 6 is a schematic block diagram of an exemplary system for specifying hardware functionality in accordance with an aspect of the present invention.

FIG. 6 illustrates a system 600 for specifying hardware functionality in accordance with an aspect of the present invention. Two hardware devices, a device 605 and a device 610, are depicted to exemplify the present invention. However, the example is not limitative. For example, any number of devices can be utilized, and thus the invention is not so limited. The hardware devices 605–610 can be, for example, watchdog timers, debugger ports, EMS ports, interrupt controller, bus controller, etc. The hardware devices 605–610 are coupled to registers 615–620, respectively. The number, size, location, value, etc. of the registers 615–620 are unique to the hardware devices 605–610. The registers 615–620 can be physically integrated into the hardware device 605–610. Additionally, the registers 615–620 can vary in size (e.g., 16 bit, 32 bit, 64 bit, . . . ).

The hardware devices 605–610 additionally can utilize hardware resource tables 625–630, respectively, to describe the hardware devices 605–610 to a software component. The hardware resource tables 625–630 include a series of instructions, which can be linked together to perform an action. More than one action can reside within the hardware resource table 625–630. The series of instructions comprise hardware register primitives that are defined by the pseudo-language, which facilitates a common framework to implement the present invention. According to an aspect of the present invention, the hardware resource tables 625–630 can be fixed resource tables defined by the Advanced Configuration and Power Interface (ACPI) Specification, Version 2.0.

The hardware resource tables 625–630 can be stored contiguously by the firmware vendor in memory of the hardware devices 605–610. As known, firmware is software which is embedded in the hardware device that can be read and modified by the device user, but cannot be written to or deleted.

To exemplify the hardware resource tables 625–630, reference is made to a watchdog resource table (WDRT) for a watchdog timer. The example is made for illustration purposes and the invention is not so limited. The watchdog resource table (WDRT) can be defined as follows:

| Field | Byte Length | Byte Offset | Description |
| --- | --- | --- | --- |
| ACPI Standard Header | | | |
| Header Signature | 4 | 0x0 | 'WDRT'. Signature for the Watchdog Resource Table. |
| Length | 4 | 0x4 | Length, in bytes, of entire WDRT. Entire table must be contiguous. |
| Revision | 1 | 0x8 | 2 |
| Checksum | 1 | 0x9 | Entire table must sum to zero. |
| OEMID | 6 | 0xA | OEM ID |
| OEM Table ID | 8 | 0x10 | The manufacturer model ID. |
| OEM Revision | 4 | 0x18 | OEM revision of the WDRT for the supplied OEM Table ID. |
| Creator ID | 4 | 0x1C | Vendor ID of the utility that created the table. |
| Creator Revision | 4 | 0x20 | Revision of the utility that created the table. |
| Watchdog Header | | | |
| Watchdog Header Length | 4 | 0x24 | Length of Watchdog Header |
| PCI Segment | 1 | 0x28 | PCI segment number. For systems which don't support PCI Segments, this number must be 0xFF. |
| PCI Bus Number | 1 | 0x29 | PCI Bus Number is table describes a PCI device. Must be 0xFF if it is not a PCI device. |
| PCI Device Number | 1 | 0x2A | PCI Device Number if table describes a PCI device. Must be 0xFF if it is not a PCI device. |
| PCI Function Number | 1 | 0x2B | PCI Function Number if table describes a PCI device. Must be 0xFF if it is not a PCI device. |
| Timer Period | 4 | 0x2C | Contains the period of one timer count (in milliseconds). |
| Max Count | 4 | 0x30 | Contains the maximum counter value that this watchdog implementation supports (in count intervals). |
| Min Count | 4 | 0x34 | Contains the minimum counter value that this watchdog implementation supports (in count intervals). |
| Watchdog Flags | 1 | 0x38 | Each flag that is true for the watchdog hardware should have the appropriate flag set in Watchdog Flags. All other bits should be zero. |
| Reserved | 3 | 0x39 | |
| Number Watchdog Instruction Entries | 4 | 0x3C | Contains the number of Watchdog Instruction Entries in the table. |
| Watchdog Action Table | | | |
| Watchdog Instruction Entries | | 0x40 | A series of Watchdog Instruction Entries. |

The watchdog resource table comprises three sections, namely the ACPI Standard Header, Watchdog Header and the Watchdog Action Table. The Watchdog Header describes global information regarding the watchdog hardware and the structure of the table. The Watchdog Action Table includes a series of instruction entries (e.g., primitive operation, register size, register location, value, bitmask, . . . ) to interact with the register(s) 615–620 of the hardware device 625–630 to perform high level actions.

The following is an exemplary watchdog instruction entry:

| Field | Byte Length | Byte Offset | Description |
|---|---|---|---|
| Action Identifier | 1 | N | The Watchdog Action this instruction is part of. |
| Instruction Flags | 1 | N + 0x1 | Primitive instruction |
| Reserved | 1 | N + 0x2 | |
| Register Size | 1 | N + 0x3 | Size of the watchdog hardware register utilized in this instruction. Size is in bytes with the max value of 4 bytes. |
| Register Region | 12 | N + 0x4 | Generic Address Structure as defined in section 5.2.3.1 of the ACPI Specification to describe the address and bit |
| Value | 4 | N + 0x10 | The value corresponding to the given Watchdog Instruction. |
| Mask | 4 | N + 0x14 | The bit mask required to obtain the bit(s) corresponding to the Watchdog Instruction in a given bit range defined by Register Region. |

The instruction flag indicates a primitive action as defined by the pseudo-language. The pseudo-language can provide an abstraction to facilitate utilization of a common software driver for disparate hardware devices. For example, the primitives can be reads, writes, masked reads, masked writes, etc. of hardware register(s) 615–620. For example, the pseudo-code for read and write hardware register primitives can be defined as follows:

READ:
X=Read(register)
X=X>>Bit Offset described in Register Region
X=X & Mask
WRITE:
X=Value & Mask
X=X<<Bit Offset described in Register Region
If(Preserve Register)
   Y=Read(register)
   Y=Y &~(Mask <<Bit Offset)
   X=X|Y
Write(X,Register)

The system 600 additionally comprises an Advanced Configuration and Power Interface (ACPI) table 635, although the device is not so limited. The ACPI specification facilitates a common interface for robust operating system directed configuration and power management. The ACPI table 635 describes the interface to the hardware.

The system 600 also comprises a processing component 640. The processing component 640 utilizes a boot loader which can concurrently load the ACPI table 635 and the hardware resource tables 625–630 for each hardware device 605–610 described in the ACPI namespace. The ACPI namespace is part of the ACPI BIOS set up by hardware vendors and is a hierarchical tree structure in operating system controlled memory. Thus, the hardware resource tables 625–630 can be loaded prior to boot or during initialization.

Once the hardware resource tables 625–630 are loaded, the processing component 640 is operable to perform a hardware action (e.g., reboot system, reset timer, . . . ). The processing component 640 achieves the hardware action by effectuating a series of instructions which are stored in the hardware resource tables 625–630. The instructions comprises hardware register primitives which are defined according to a common hardware register pseudo-language. The primitives are operations such as, for example, reads, writes, masked reads, masked writes, etc. of one or more registers associated with a unique hardware device. Additionally, the processing component 640 utilizes resources (e.g., register's location, size, value, bitmask detailing bits to read and/or write, action identifier, . . . ) stored in the hardware resource tables 625–630 to perform the higher level actions. The series of instructions are linked together to effectuate the high level action. The high level action can be performed prior to operating system kernel availability since the hardware resource tables 625–630 are loaded with the ACPI table 635.

Figure 7:
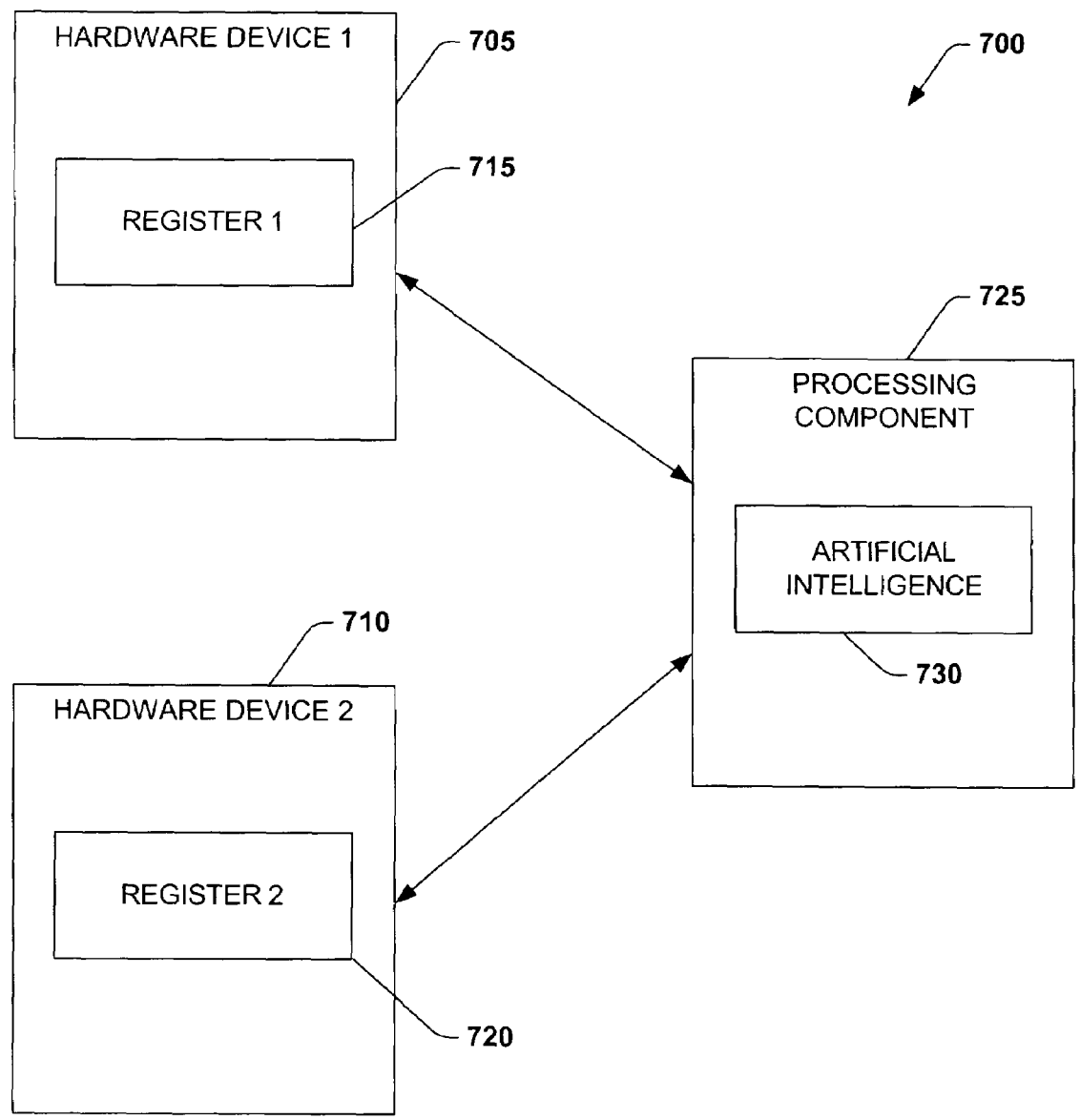
FIG. 7 is a schematic block diagram of an exemplary system for specifying hardware functionality in accordance with an aspect of the present invention.

FIG. 7 illustrates a system 700 for specifying hardware functionality according to an aspect of the present invention. The system comprises a hardware device 705 and a hardware device 710 which can be, for example, watchdog timers, debugger ports, EMS ports, interrupt controller, bus controller, etc. Although two hardware devices are represented, the present invention is not so limited.

The hardware devices 705–710 are operably connected to registers 715–720 that are unique dependent upon hardware vendor design. For example, disparate sizes, locations, numbers of registers, etc. are utilized to facilitate unique device functionality. Functionality of the hardware devices 705–710 is effectuated by reading from and writing to the hardware registers 715–720.

The system 700 further comprises a processing component 725. The processing component 725 interacts with the hardware devices 705–710 to utilize the functionalities. The processing component 725 comprises an artificial intelligence component 730 which infers characteristics of the hardware device 705–710 and/or the registers 715–720. The artificial intelligence component 730 can infer the unique actions which the hardware devices 705–710 are capable of performing. Additionally, the artificial intelligence component 730 can assemble instructions including hardware register primitives, which are operations such as, for example, reads, writes, masked reads, masked writes, etc. of hardware registers 715–720, into a series to perform the higher level actions. The hardware register primitives are specified according to a common hardware register pseudo-language.

Once the artificial intelligence component 730 links the series of instructions, the processing component 725 can control functionality of the hardware devices 705–710. The processing component utilizes the series of instructions, which comprising hardware register primitives and additional resources such as, for example, register's size, location, value, bitmask, etc. to effectuate hardware device functionality.

Figure 8:
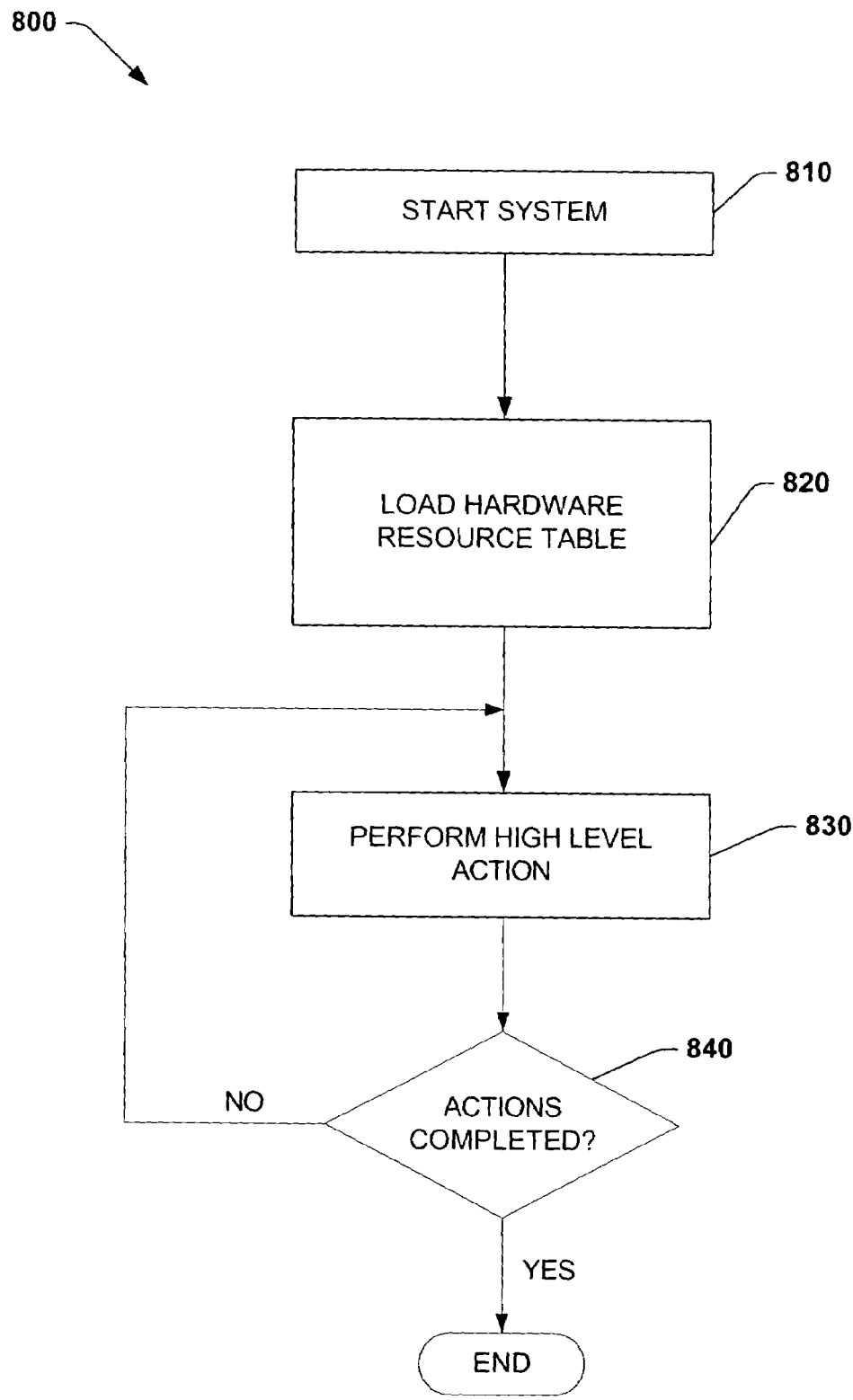
FIG. 8 is a flow diagram of a method for specifying hardware functionality in accordance with an aspect of the present invention.
Figure 9:
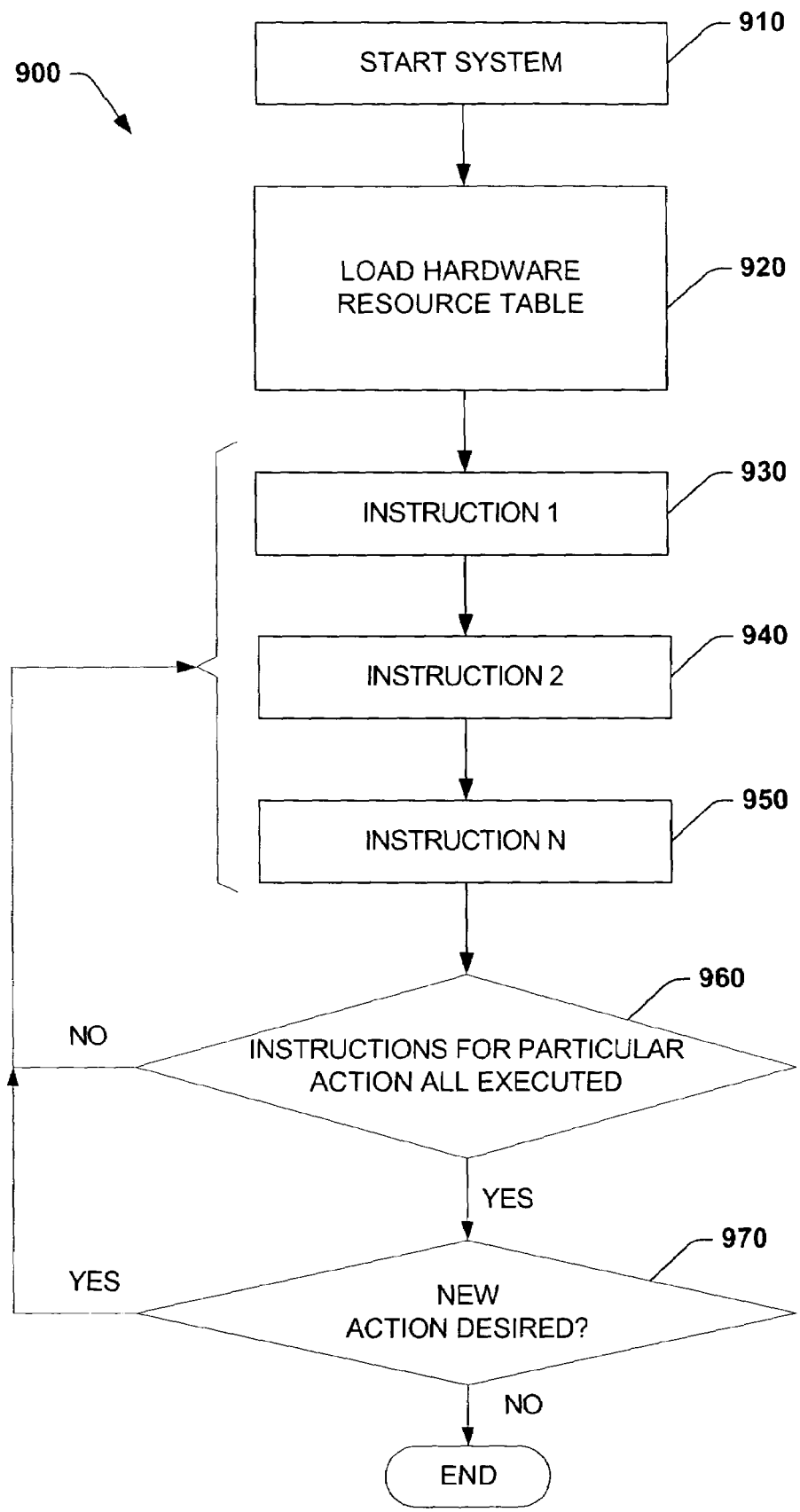
FIG. 9 is a flow diagram of a method for specifying hardware functionality in accordance with an aspect of the present invention.
Figure 10:
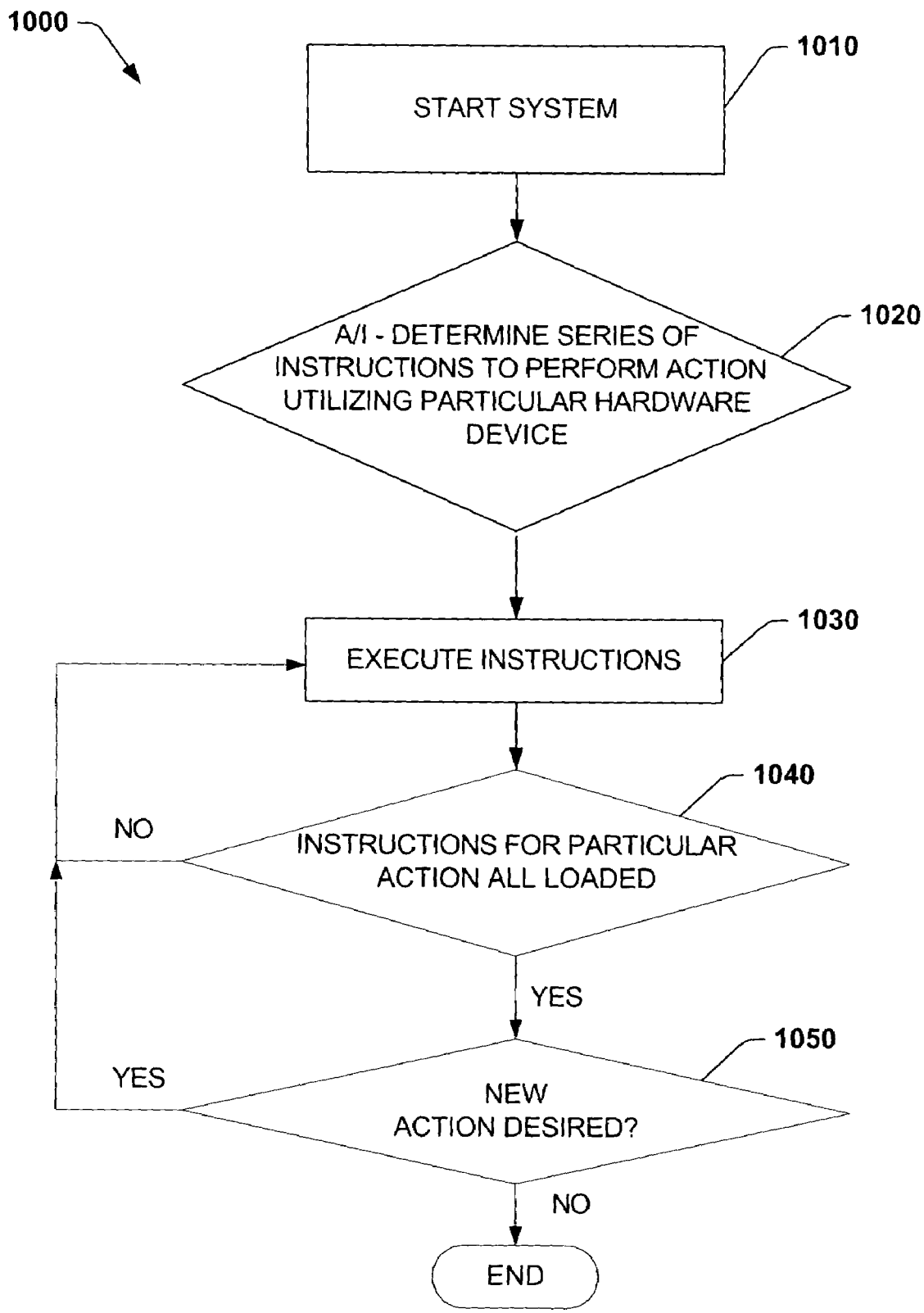
FIG. 10 is a flow diagram of a method for specifying hardware functionality in accordance with an aspect of the present invention.

FIGS. 8–10 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

Turning to FIG. 8, a methodology 800 for specifying hardware functionality starts the system at 810. This can include, for example, booting a computer, etc. At 820, a hardware resource table is loaded. The hardware resource table can be created by BIOS and/or firmware and stored in memory. An operating system's boot loader loads the hardware resource table. According to an aspect of the present invention, the hardware resource table can be an Advanced Configuration and Power Interface (ACPI) table. The hardware resource table is available in the ACPI namespace. The ACPI namespace is a hierarchical tree structure in operating system controlled memory that contains named objects. The boot loader initializes, starts and pings the hardware device; thus, the hardware resource table can be loaded prior to boot or during initialization and the hardware device can be accessible prior to operating system kernel availability. The device can be accessible prior to kernel initialization by requiring the device description to available prior to the kernel, which can be accomplished, for example, utilizing an ACPI table. The hardware resource table comprises a series of instructions which are linked together to perform a higher level action upon the hardware device.

At 830, a high level action is performed. The high level action comprises a series of instructions which comprise hardware register primitives defined by a common hardware register pseudo-language. The high level action can be, for example, rebooting a system, resetting a timer, etc. The present invention contemplates performing more than one action as shown by decision block 840.

FIG. 9 illustrates a flow diagram for another methodology 900 for carrying out the present invention. At 910, a system is started. This can include, for example, booting a computer, etc. which begins operation of the boot loader. At 920, the hardware resource table is loaded by the boot loader. The hardware resource table can be a fixed resource table defined according to the ACPI Specification, Version 2.0, for example. The hardware resource table can be created by firmware and stored in memory associated with the hardware device and contains a series of hardware register primitives unique to the hardware device which define hardware actions. Since the boot loader loads the hardware resource table, the hardware device can be accessible prior to operating system kernel availability.

At 930–950 a series instructions comprising hardware register primitives (1 though N, wherein "N" is an integer) are performed. The hardware register primitives can be, for example, reads, writes, masked reads, masked writes, etc. of at least one hardware register associated with a hardware device. The series of instructions are unique to the vendor's hardware device and the linked series of instructions describes higher level actions utilizing abstractions to allow a single software component to be utilized for disparate hardware designs. The number of instructions is hardware specific. The primitives are defined according to a common framework by utilizing a common hardware register pseudo-language. At 960, it is determined whether or not all relevant instructions for the particular functionality are executed, this process continues until all instructions required to effect the functionality are loaded. Once, complete, the process determines at 970 if another functionality is desired to be effected, and if so, instructions associated therewith are executed until complete.

FIG. 10 illustrates a methodology 1000 for specifying hardware functionality according to an aspect of the present invention. A system is started at 1010. For example, a computer can be booted, etc. At 1020, artificial intelligence infers actions which a unique hardware device can perform. For example, the artificial intelligence can determine that a hardware device such as a watchdog timer is operable to perform a reset of the timer. The artificial intelligence can also infer a series of instructions which can effectuate the hardware action. Instructions comprise hardware register primitives and resources to perform the primitive (e.g., register's location, register's size, value, bitmask detailing the bits to read and/or write. The hardware register primitives are defined according to a common register pseudo-language.

At 1030, the series of instructions determined at 1020 are effectuated. The series of instructions is defined by the unique hardware device. The primitives utilized can be, for example, reading, writing, masked reading, masked writing, etc. of hardware register(s) to effectuate a high level action. At 1040, it is determined whether or not all relevant instructions for the particular functionality are executed; this process continues until all instructions required to effect the functionality are executed. Once, complete, the artificial intelligence infers at 1050 if another functionality is desired to be effected, and if so, instructions associated therewith are executed until complete.

Figure 11:
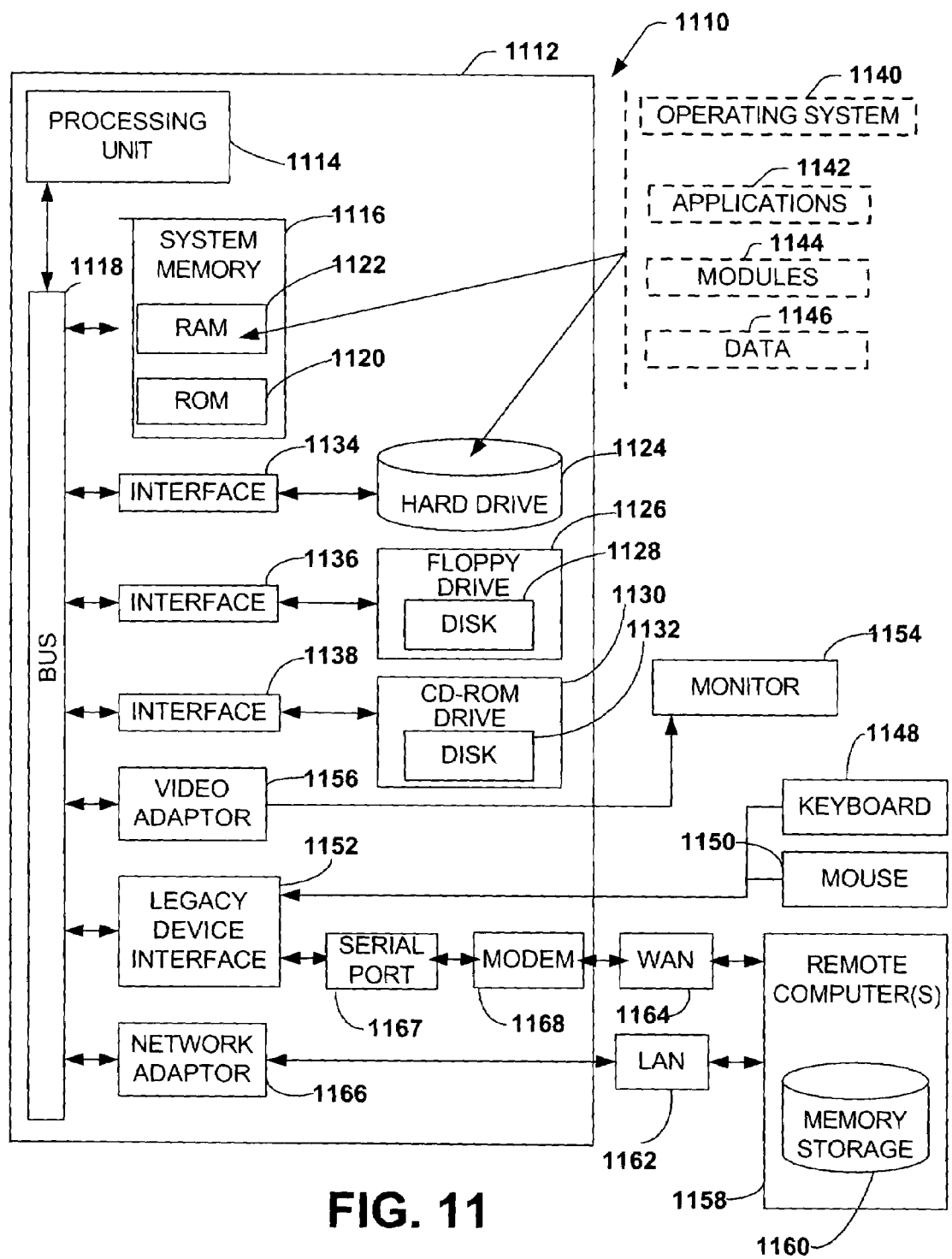
FIG. 11 is a schematic block diagram of an exemplary operating environment for a system configured in accordance with the present invention.

FIG. 11 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 11, an exemplary environment 1110 for implementing various aspects of the invention includes a computer 1112, including a processing unit 1114, a system memory 1116, and a system bus 1118 that couples various system components including the system memory to the processing unit 1114. The processing unit 1114 may be any of various commercially available processors. Dual microprocessors and other multi-processor architectures also can be used as the processing unit 1114.

The system bus 1118 may be any of several types of bus structure including a memory bus or memory controller, a peripheral bus, and a local bus using any of a variety of commercially available bus architectures. The system memory 1116 includes read only memory (ROM) 1120 and random access memory (RAM) 1122. A basic input/output system (BIOS), containing the basic routines that help to transfer information between elements within the computer 1112, such as during start-up, is stored in ROM 1120.

The computer 1112 may further include a hard disk drive 1124, a magnetic disk drive 1126, e.g., to read from or write to a removable disk 1128, and an optical disk drive 1130, e.g., for reading a CD-ROM disk 1132 or to read from or write to other optical media. The hard disk drive 1124, magnetic disk drive 1126, and optical disk drive 1130 are connected to the system bus 1118 by a hard disk drive interface 1134, a magnetic disk drive interface 1136, and an optical drive interface 1138, respectively. The computer 1112 typically includes at least some form of computer readable media. Computer readable media can be any available media that can be accessed by the computer 1112. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 1112. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 1122, including an operating system 1140, one or more application programs 1142, other program modules 1144, and program non-interrupt data 1146. The operating system 1140 in the computer 1112 can be any of a number of commercially available operating systems.

A user may enter commands and information into the computer 1112 through a keyboard 1148 and a pointing device, such as a mouse 1150. Other input devices (not shown) may include a microphone, an IR remote control, a joystick, a game pad, a satellite dish, a scanner, or the like. These and other input devices are often connected to the processing unit 1114 through a legacy device interface 1152 that is coupled to the system bus 1118, but may be connected by other interfaces, such as a parallel port, serial port, a game port, a universal serial bus ("USB"), an IR interface, etc. A monitor 1154, or other type of display device, is also connected to the system bus 1118 via an interface, such as a video adapter 1156. In addition to the monitor, a computer typically includes other peripheral output devices (not shown), such as speakers, printers etc.

The computer 1112 may operate in a networked environment using logical and/or physical connections to one or more remote computers, such as a remote computer(s) 1158. The remote computer(s) 1158 may be a workstation, a server computer, a router, a personal computer, microprocessor based entertainment appliance, a peer device or other common network node, and typically includes many or all of the elements described relative to the computer 1112, although, for purposes of brevity, only a memory storage device 1160 is illustrated. The logical connections depicted include a local area network (LAN) 1162 and a wide area network (WAN) 1164. Such networking environments are commonplace in offices, enterprise-wide computer networks, intranets and the Internet.

When used in a LAN networking environment, the computer 1112 is connected to the local network 1162 through a network interface or adapter 1166. When used in a WAN networking environment, the computer 1112 typically includes a modem 1168, or is connected to a communications server on the LAN, or has other means for establishing communications over the WAN 1164, such as the Internet. The modem 1168, which may be internal or external, is connected to the system bus 1118 via a serial port 1167 and the legacy device interface 1152. In a networked environment, program modules depicted relative to the computer 1112, or portions thereof, may be stored in the remote memory storage device 1160. It will be appreciated that the network connections shown are exemplary and other means of establishing a communications link between the computers may be used.

Figure 12:
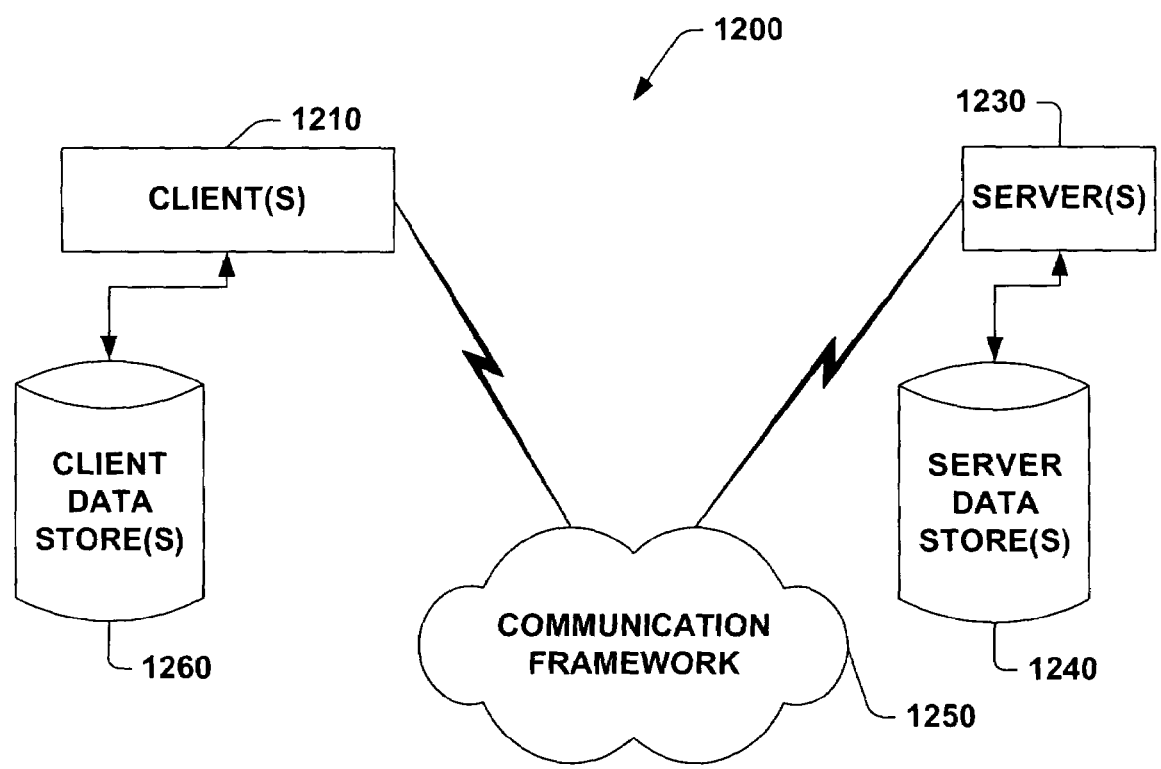
FIG. 12 is a schematic block diagram of a sample-computing environment with which the present invention can interact.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the present invention, for example. One possible communication between a client 1210 and a server 1230 may be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates specifying and utilizing hardware functionality, comprising:
a specification component that specifies hardware functionality via execution of a common hardware register pseudo-language, the language comprising a set of hardware register primitives that are defined for respective device classes, and provide a framework for the specification component to specify functionality of hardware.

2. The system of claim 1, the set of primitives that are loaded prior to at least one of: boot-up and during initialization.

3. The system of claim 2, the set of primitives is concurrently loaded with an advanced configuration and power interface (ACPI) table.

4. The system of claim 1, further comprising a linking component that links instructions to effect a particular higher-level functionality.

5. The system of claim 4, at least one of the instructions is associated with a plurality of registers.

6. The system of claim 4, the instructions comprise primitive(s) and corresponding resources with respect to a particular action.

7. The system of claim 4, the instructions are unique dependent upon a vendor's proprietary hardware.

8. The system of claim 1, a subset of the primitives effects reading from a hardware register.

9. The system of claim 1, a subset of the primitives effects writing to a hardware register.

10. The system of claim 1, the set of primitives includes at least bit-masked reading from a hardware register.

11. The system of claim 1, the set of primitives includes at least bit-masked writing to a hardware register.

12. The system of claim 1, the pseudo-language is a complete set of possible operations that can be performed upon a generic hardware register.

13. The system of claim 1, further comprising a common driver that supports functionality of the hardware.

14. The system of claim 1, further comprising an artificial intelligence (AI) component that infers characteristics of a hardware device.

15. The system of claim 14, the AI component infers a series of instructions to perform a high level action.

16. The system of claim 15, the instructions comprise a primitive and resources to perform a primitive.

17. The system of claim 15, the AI component comprises an implicitly trained classifier.

18. The system of claim 15, the AI component performs a probabilistic-based utility analysis in connection with loading the set of primitives.

19. A method that specifies hardware functionality, comprising:
   determining a hardware device type; and
   loading a series of instructions prior to operating system kernel availability wherein the instructions comprise at least primitives that are defined by a common hardware register pseudo-language.

20. The method of claim 19, loading an advanced configuration and power interface (ACPI) table concurrent with the instructions.

21. The method of claim 19, linking the series of instructions to effectuate a high level action.

22. The method of claim 21, performing the series of instructions upon at least one hardware register.

23. The method of claim 21, performing at least one instruction with more than one register.

24. The method of claim 19, inferring the series of instructions to perform a high level action with artificial intelligence.

25. A system specifying hardware functionality, comprising:
   means for specifying a hardware functionality; and
   means for linking instructions that comprise at least hardware register primitives, wherein the primitives are defined by a common hardware register pseudo-language.

26. The system of claim 25, further comprising means for concurrently loading the instructions with an advanced configuration and power interface (ACPI) table.

27. The system of claim 25, further comprising means for linking a subset of the instructions to effect a particular higher-level functionality.

28. The system of claim 25, further comprising means for associating at least one instruction with a plurality of registers.

29. The system of claim 25 further comprising means for describing the instruction as primitive operation(s) and corresponding resources with respect to a particular action.

30. The system of claim 25, further comprising means for inferring characteristics of a hardware device.

31. The system of claim 30, further comprising means for assembling the set of primitives.

32. The system of claim 30 further comprising means for performing a probabilistic-based utility analysis in connection with executing the set of instructions.

33. A computer readable medium having stored thereon the computer-executable component(s) of claim 1.

34. A computer readable medium having stored thereon the computer-executable instructions for implementing the method of claim 19.

35. A computer readable medium having stored thereon the system of claim 25.

* * * * *